US012604284B2

(12) United States Patent
Panzner et al.

(10) Patent No.: US 12,604,284 B2
(45) Date of Patent: Apr. 14, 2026

(54) SIDELINK SYNCHRONIZATION IN TELECOMMUNICATION SYSTEMS

(71) Applicant: NOKIA TECHNOLOGIES OY, Espoo (FI)

(72) Inventors: Berthold Panzner, Holzkirchen (DE); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 557 days.

(21) Appl. No.: 17/999,046

(22) PCT Filed: May 29, 2020

(86) PCT No.: PCT/EP2020/064996
§ 371 (c)(1),
(2) Date: Nov. 16, 2022

(87) PCT Pub. No.: WO2021/239251
PCT Pub. Date: Dec. 2, 2021

(65) Prior Publication Data
US 2023/0180159 A1      Jun. 8, 2023

(51) Int. Cl.
H04W 56/00          (2009.01)
H04W 36/00          (2009.01)
(Continued)

(52) U.S. Cl.
CPC ...  H04W 56/0015 (2013.01); H04W 36/0072 (2013.01); H04W 36/037 (2023.05); H04W 36/08 (2013.01); H04W 36/14 (2013.01)

(58) Field of Classification Search
None
See application file for complete search history.

(56) References Cited

U.S. PATENT DOCUMENTS

| | | | |
|---|---|---|---|
| 2015/0223204 A1 | 8/2015 | Cao et al. | |
| 2017/0289870 A1 | 10/2017 | Liu et al. | |
| 2019/0110232 A1 | 4/2019 | Lu et al. | |

FOREIGN PATENT DOCUMENTS

| | | | | |
|---|---|---|---|---|
| WO | 2017119919 A1 | 7/2017 | | |
| WO | WO2017119919 | * 7/2017 | .............. | H04W 8/00 |

(Continued)

OTHER PUBLICATIONS

International Search Report and Written Opinion for International Application No. PCT/EP2020/064996, mailed on Feb. 24, 2021, 16 pages.

(Continued)

*Primary Examiner* — Abdelillah Elmejjarmi
(74) *Attorney, Agent, or Firm* — Lippes Mathias LLP

(57) ABSTRACT

A first UE sending via a sidelink messages to second UE(s) indicating the first UE is changing to a different network access node and therefore might be changing a synchronization source, which the second UE(s) use to maintain a sidelink communication between the first and second UEs. The first UE performs a handover process from a first network access node in the first wireless network to the different network access node in the second wireless network. The second wireless network uses the second synchronization source. The first UE attempts to synchronize the second UE(s) to the second synchronization source. The second UE, and first and second networks may interoperate to effectuate this process. Methods, apparatus, software, and computer program products are disclosed.

9 Claims, 12 Drawing Sheets

(51) Int. Cl.
   *H04W 36/08* (2009.01)
   *H04W 36/14* (2009.01)

(56) References Cited

FOREIGN PATENT DOCUMENTS

| | | |
|---|---|---|
| WO | 2017135877 A1 | 8/2017 |
| WO | 2019/104280 A1 | 5/2019 |
| WO | 2020/144304 A1 | 7/2020 |

OTHER PUBLICATIONS

3GPP TSG-RAN WG4 Meeting #95-e, R4-2006472; "Discussion on NR V2X Interruption Requirement"; Agenda Item: 6.4.5.4; Source: MediaTek Inc.; Electronic Meeting; May 25-Jun. 5, 2020; 7 pages.

"ICT-18-2018: 5G for cooperative, connected and automated mobility", 5G PPP, Retrieved on Aug. 1, 2025, Webpage available at : https://5g-ppp.eu/5g-carmen/.

"Reply LS on sidelink synchronization under multiple synchronization sources with different timing", 3GPP TSG RAN WG2#108, R2-1916465, RAN2, Nov. 18-22, 2019, 2 pages.

"LS on sidelink synchronization under multiple synchronization sources with different timing", 3GPP TSG RAN WG2#108, R2-1914340, RAN WG4, Nov. 18-22, 2019, 2 pages.

"LS on sidelink synchronization under multiple synchronization sources with different timing", 3GPP TSG-RAN WG4 #92bis, R4-1912826, RAN WG4, Aug. 14-Oct. 18, 2019, 2 pages.

"Rel-17 sidelink for V2X—Automotive Perspective Challenges", 3GPP TSG RAN Meeting #86, RP-193084, GM ATCI, Agenda Item: 9.1.1, Dec. 9-12, 2019, pp. 1-9.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.8.0, Dec. 2019, pp. 1-134.

"3rd Generation Partnership Project; Technical Specification Group Radio Access Network; NR; Medium Access Control (MAC) protocol specification (Release 15)", 3GPP TS 38.321 V15.8.0, Dec. 2019, pp. 1-78.

"3rd Generation Partnership Project; Technical Specification Group Radio Access Network; NR; Requirements for support of radio resource management (Release 16)", 3GPP TS 38.133 V16.2.0, Dec. 2019, 1130 pages.

Martín-Sacristán et al., "Low-Latency Infrastructure-Based Cellular V2V Communications for Multi-Operator Environments With Regional Split", IEEE Transactions on Intelligent Transportation Systems, vol. 22, No. 02, Jan. 7, 2020, pp. 1052-1067.

Hegde et al., "Enhanced Resource Scheduling for Platooning in 5G V2X Systems", IEEE 2nd 5G World Forum, Sep. 30-Oct. 2, 2019, pp. 108-113.

"Miscellaneous corrections on TS 38.331 (Rapporteur CR)", 3GPP TSG-RAN WG2 Meeting # 113bis-e, R2-2104105, Huawei, Apr. 12-20, 2021, 13 pages.

Office action received for corresponding European Patent Application No. 20729735.9, dated May 8, 2025, 4 pages.

* cited by examiner

SIDELINK SYNCHRONIZATION IN TELECOMMUNICATION SYSTEMS

CROSS-REFERENCE TO RELATED APPLICATIONS

This application is a national stage entry of International Application No. PCT/EP2020/064996, filed May 29, 2020, entitled "SIDELINK SYNCHRONIZATION IN TELE-COMMUNICATION SYSTEMS" which is hereby incorporated by reference in its entirety.

TECHNICAL FIELD

This invention relates generally to wireless (e.g., cellular) to vehicle communication and, more specifically, relates to synchronization problems in sidelink for vehicle communication.

BACKGROUND

Vehicle-to-everything (V2X) communication includes the passing of information from a vehicle to any entity that may affect the vehicle, and vice versa. One possible implementation has vehicles exchanging data, such as for traffic conditions, emergency stoppage, and the like. The main motivations for V2X are road safety, traffic efficiency, and energy savings.

The direct communication between vehicle and other devices uses a so-called PC5 interface, which is the radio interface for D2D (device-to-device) communication. A communication establishment through PC5 may either be Uu based (mode-1), where the device request PC5 resources through the Uu interface, or device centric (mode-2) based on sensing also include a reference point where the User Equipment (UE), e.g., a mobile handset or a device in the vehicle, directly communicates with another UE over the direct channel. That is, normally, D2D might go from a UE, coordinated by the base station and corresponding system, to another UE. Using the PC5 interface allows direct D2D communications.

Consequently, the PC5 interface therefore allows D2D communications without having to go through the network. This provides less lag for communications between vehicles, for instance, as one or more networks do not have to be traversed.

There can, however, be synchronization and other issues especially in scenarios where vehicles using communication over PC5 are crossing borders or are attached to different network operators as described below.

BRIEF SUMMARY

This section is intended to include examples and is not intended to be limiting.

In an exemplary embodiment, a method is disclosed that includes sending via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment. The method includes performing by the first user equipment a handover process from a first network access node in the first wireless network to the different network access node in the second wireless network, the second wireless network using the second synchronization source. The method further includes attempting by the first user equipment to synchronize the one or more second user equipment to the second synchronization source.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: sending via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment; performing by the first user equipment a handover process from a first network access node in the first wireless network to the different network access node in the second wireless network, the second wireless network using the second synchronization source; and attempting by the first user equipment to synchronize the one or more second user equipment to the second synchronization source.

An exemplary computer program product includes a computer-readable storage medium bearing computer program code embodied therein for use with a computer. The computer program code includes: code for sending via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment; code for performing by the first user equipment a handover process from a first network access node in the first wireless network to the different network access node in the second wireless network, the second wireless network using the second synchronization source; and code for attempting by the first user equipment to synchronize the one or more second user equipment to the second synchronization source.

In another exemplary embodiment, an apparatus comprises means for performing: sending via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment; performing by the first user equipment a handover process from a first network access node in the first wireless network to the different network access node in the second wireless network, the second wireless network using the second synchronization source; and attempting by the first user equipment to synchronize the one or more second user equipment to the second synchronization source.

In an exemplary embodiment, a method is disclosed that includes receiving, via a sidelink, one or more messages from a first user equipment and by a second user equipment indicating the first user equipment is changing to a different network access node and therefore might be changing a synchronization source, which the second user equipment uses to maintain a sidelink communication between the first and second user equipment. The method includes preparing by the second user equipment for a temporary service degradation over the sidelink.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, via a sidelink, one or more messages from a first user equipment and by a second user equipment indicating the first user equipment is changing to a different network access node and therefore might be changing a synchronization source, which the second user equipment uses to maintain a sidelink communication between the first and second user equipment; and preparing by the second user equipment for a temporary service degradation over the sidelink.

An exemplary computer program product includes a computer-readable storage medium bearing computer program code embodied therein for use with a computer. The computer program code includes: code for receiving, via a sidelink, one or more messages from a first user equipment and by a second user equipment indicating the first user equipment is changing to a different network access node and therefore might be changing a synchronization source, which the second user equipment uses to maintain a sidelink communication between the first and second user equipment; and code for preparing by the second user equipment for a temporary service degradation over the sidelink.

In another exemplary embodiment, an apparatus comprises means for performing: receiving, via a sidelink, one or more messages from a first user equipment and by a second user equipment indicating the first user equipment is changing to a different network access node and therefore might be changing a synchronization source, which the second user equipment uses to maintain a sidelink communication between the first and second user equipment; and preparing by the second user equipment for a temporary service degradation over the sidelink.

In an exemplary embodiment, a method is disclosed that includes receiving, at a first network access node in a wireless network and from a first user equipment, one or more measurement reports. The method also includes performing, based on the one or more measurement reports, a process to handover the first user equipment from the first network access node to a second network access node. The first network access node is in a first network that uses a first synchronization source and the second network access node is in a second network that uses a second synchronization source. The first and second user equipment use timing of one of the first or second synchronization sources to maintain a sidelink communication over a sidelink between the first and second user equipment. The method includes receiving at the first network access node a message from the second network indicating at least a time difference between the first and second synchronization sources. The method also includes sending one or more messages from the first network access node to the second user equipment to allow the second user equipment to synchronize to the second synchronization source.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, at a first network access node in a wireless network and from a first user equipment, one or more measurement reports; performing, based on the one or more measurement reports, a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; receiving at the first network access node a message from the second network indicating at least a time difference between the first and second synchronization sources; and sending one or more messages from the first network access node to the second user equipment to allow the second user equipment to synchronize to the second synchronization source.

An exemplary computer program product includes a computer-readable storage medium bearing computer program code embodied therein for use with a computer. The computer program code includes: code for receiving, at a first network access node in a wireless network and from a first user equipment, one or more measurement reports; code for performing, based on the one or more measurement reports, a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; code for receiving at the first network access node a message from the second network indicating at least a time difference between the first and second synchronization sources; and code for sending one or more messages from the first network access node to the second user equipment to allow the second user equipment to synchronize to the second synchronization source.

In another exemplary embodiment, an apparatus comprises means for performing: receiving, at a first network access node in a wireless network and from a first user equipment, one or more measurement reports; performing, based on the one or more measurement reports, a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; receiving at the first network access node a message from the second network indicating at least a time difference between the first and second synchronization sources; and sending one or more messages from the first network access node to the second user equipment to allow the second user equipment to synchronize to the second synchronization source.

In an exemplary embodiment, a method is disclosed that includes receiving, from a first network access node in a wireless network and at a second network access node, a handover request for a first user equipment. The method includes performing a process to handover the first user equipment from the first network access node to a second network access node. The first network access node is in a first network that uses a first synchronization source and the second network access node is in a second network that uses a second synchronization source. The first and second user equipment use timing of one of the first or second synchronization sources to maintain a sidelink communication over a sidelink between the first and second user equipment. The method includes receiving at the second network access node a message from the first user equipment indicating at least a time difference between the first and second synchronization sources. The method further includes sending a message, from the second network access node to the first network access node, indicating at least the time difference between the first and second synchronization sources.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, from a first network access node in a wireless network and at a second network access node, a handover request for a first user equipment; performing a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; receiving at the second network access node a message from the first user equipment indicating at least a time difference between the first and second synchronization sources; and sending a message, from the second network access node to the first network access node, indicating at least the time difference between the first and second synchronization sources.

An exemplary computer program product includes a computer-readable storage medium bearing computer program code embodied therein for use with a computer. The computer program code includes: code for receiving, from a first network access node in a wireless network and at a second network access node, a handover request for a first user equipment; code for performing a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; code for receiving at the second network access node a message from the first user equipment indicating at least a time difference between the first and second synchronization sources; and code for sending a message, from the second network access node to the first network access node, indicating at least the time difference between the first and second synchronization sources.

In another exemplary embodiment, an apparatus comprises means for performing: receiving, at a first network access node in a wireless network and from a first user equipment, one or more measurement reports; performing, based on the one or more measurement reports, a process to handover the first user equipment from the first network access node to a second network access node, wherein the first network access node is in a first network that uses a first synchronization source and the second network access node is in a second network that uses a second synchronization source, and wherein the first and second user equipment use timing of one of the first or second synchronization sources to maintain a sidelink communication over a sidelink between the first and second user equipment; receiving at the first network access node a message from the second network indicating at least a time difference between the first and second synchronization sources; and sending one or more messages from the first network access node to the second user equipment to allow the second user equipment to synchronize to the second synchronization source.

DETAILED DESCRIPTION OF THE DRAWINGS

Figure 1:
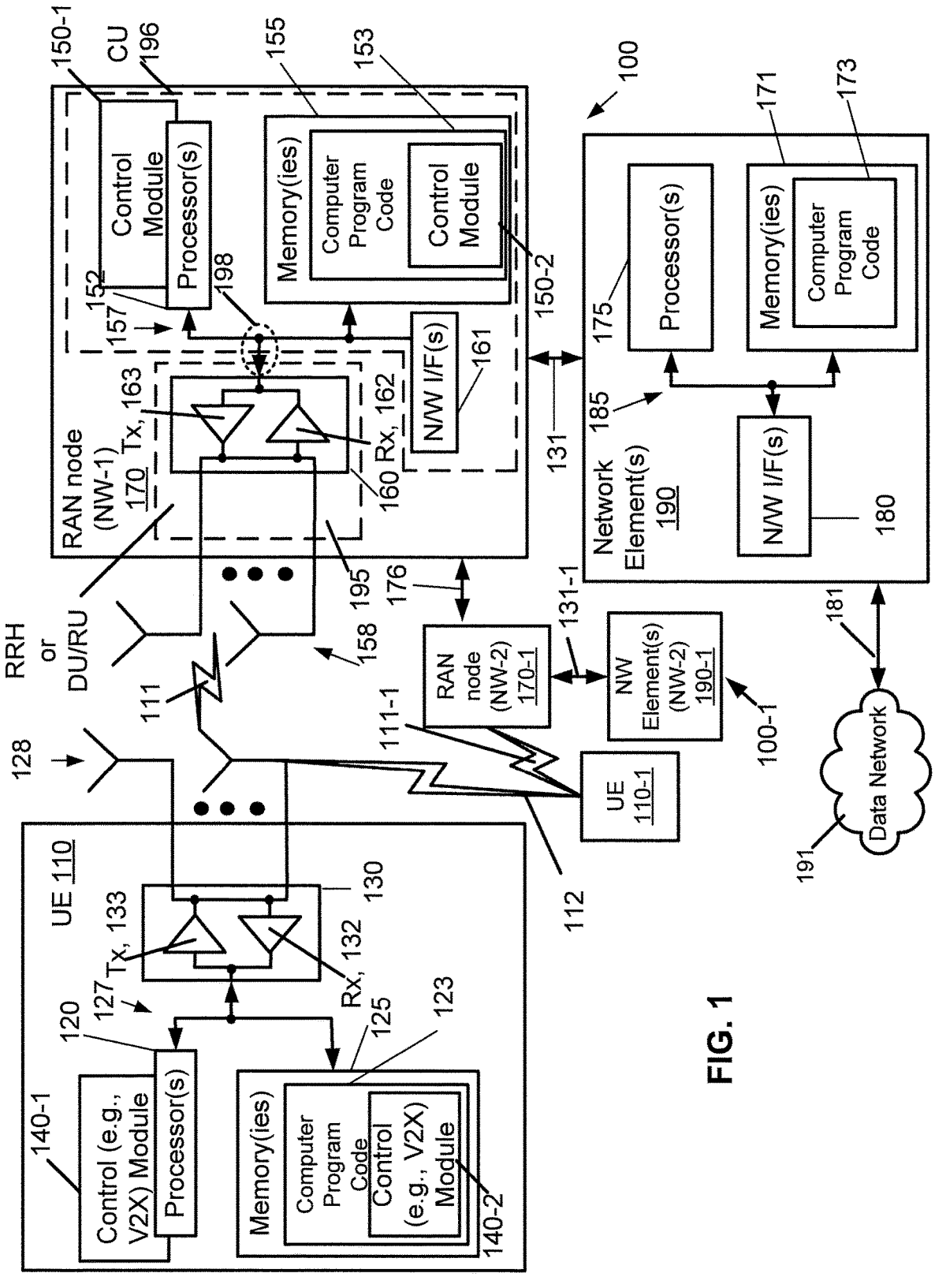
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for V2X communication in cross-operator and cross-border scenarios. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 and another UE 110-1 are in wireless communication with a wireless (e.g., cellular) network 100. This may be a first network (NW), shown as NW-1. There may also be a second network (NW) 100-1, which includes a RAN node 170-1 and network element(s) 190-1. This second network is referred to a NW-2 in FIG. 1.

A UE is a wireless, typically mobile device that can access a wireless network. The UE 110-1 is assumed to be similar to the UE 110, and therefore only the circuitry of the UE 110 is described. The UE 110 includes one or more processors 120, one or more memories 125, and one or more transceivers 130 interconnected through one or more buses 127. Each of the one or more transceivers 130 includes a receiver, Rx,

132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

The UE 110 communicates with RAN node 170 via a wireless link 111. The UE 110-1 communicates with RAN node 170-1 via wireless link 111-1. The two UEs 110, 110-1 can communicate with each other using link (e.g., a sidelink, SL) 112, via for instance a PC5 interface. As used herein, this may also be referred for simplicity as PC5 112, indicating the PC5 interface is used over a sidelink 112. Using the PC5 112, the control modules 140 in each of the UEs 110 can support V2X or other vehicle communications.

There are two RAN nodes 170, 170-1 shown. One or both UEs 110, 110-1 may communicate with the other RAN node 170 or 170-1, although links 111, 111-1 are shown only to RAN node 170 or 170-1, for ease of reference. Link(s) similar to links 111, 111-1 would be used between the UEs 110, 110-1 and the RAN node 170 or 170-1. The RAN node 170-1 is expected to be similar to the RAN node 170, and therefore only the circuitry of RAN node 170 is illustrated.

The RAN node 170 is a base station that provides access for wireless devices such as the UEs 110, 110-1 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 and/or 170-1 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120-degree cells per carrier and two carriers, then the base station has a total of 6 cells.

The wireless network 100 may include a network element or elements 190 that may include core network functionality, and which provides connectivity via a link or links 181 with a data network 191, such as a telephone network and/or a data communications network (e.g., the Internet). Similarly, the wireless network 100-1 may include a network element or elements 190-1 that may include core network functionality, and which provides connectivity via a link or links with data network, such as a telephone network and/or a data communications network (e.g., the Internet). For ease of reference, only one data network is shown in FIG. 1. The NW element(s) 190-1 are assumed to be similar in circuitry as the NW element(s) 190, and only the circuitry in NW element(s) 190 is illustrated.

Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. Similarly, the RAN node 170-1 is coupled via a link 131-1 to a network element 190-1. The links 131, 131-1 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figures 2, 4A:
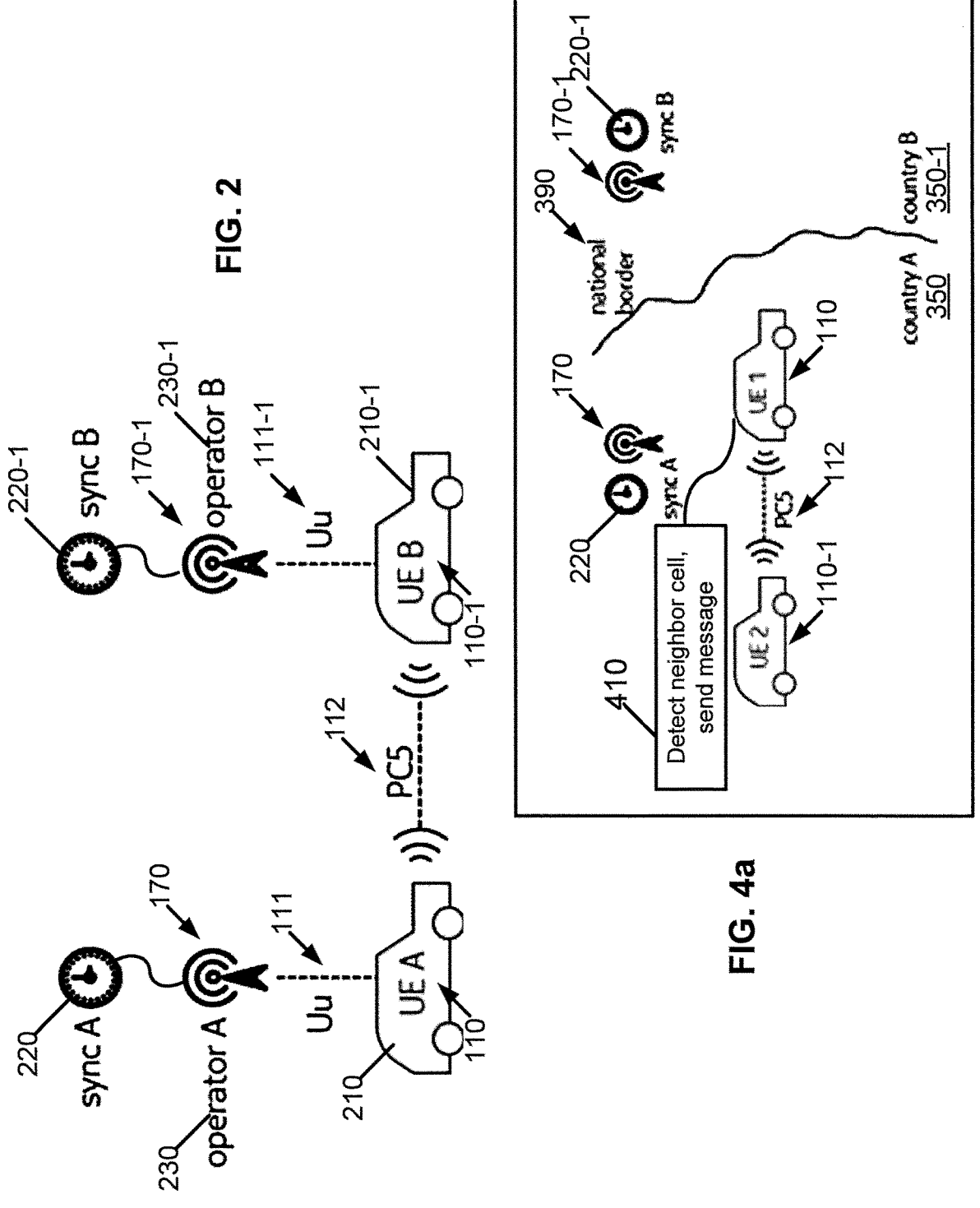
FIG. 2 illustrates a cross-operator problem in a V2X scenario where at least two UEs are connected to different operators and want to communicate over a sidelink (PC5 interface)
FIGS. 4a, 4b, and 4c are used to illustrate how a UE (UE 1) maintains a sidelink communication while crossing a national border, in an exemplary embodiment.

As described above, V2X has certain potential benefits. There are, however, issues with this. Consider a cross-operator problem, as illustrated in FIG. 2, where at least two UEs are connected to different operators and want to communicate over a sidelink (PC5 interface). A sidelink is a direct UE-to-UE (or UE-to-multiple-UEs) channel that enables UE-to-UE (or UE-to-multiple-UEs) communications. A UE-to-UE is commonly referred to as a unicast sidelink. Additionally, there are other possibilities, such as sidelink (SL) groupcast and broadcast as well, which are UE-to-multiple-UEs communications.

In FIG. 2, UE-A 110 is connected to operator A 230 via the Uu interface and the corresponding link 111 and the RAN node 170, while UE-B 110-1 is connected to operator B 230-1 via the Uu interface and the corresponding link 111-1 and the RAN node 170-1. The UEs 110, 110-1 are devices within corresponding vehicles 210, 210-1, as part of (or connected to) the vehicle or a device a person in the vehicle has. Both UEs 110 want to communicate over the PC5 interface on sidelink 112 directly with each other. The assumption is that both UEs are in RRC connected mode and in-coverage of their corresponding RANs 170. However, in real life deployments, both UEs may be connected to different PLMNs, hence both UEs may also be synchronized to different clock references, i.e., UE-A uses the synchronization (e.g., SSB) from eNB/gNB-A 170 while UE-B uses the synchronization (e.g., SSB) from eNB/gNB-B 170-1. This is illustrated in FIG. 2 by the UE A 110 being synchronized to the clock 220 shown as sync A and by the UE B 110-1 being synchronized to the clock 220-1 shown as sync B.

It should be noted that the illustration in FIG. 2 is only exemplary, e.g., the base stations 170, 170-1 from the different operators can also be co-located (e.g., which is typical for highway scenarios). Furthermore, the problem exists for both radio access technologies LTE and NR. In the example in FIG. 2, just two UEs 110 in sidelink unicast are shown for simplicity, however the problem is valid also for more than two UEs 110 in groupcast or broadcast if at least one of the UEs 110 is attached to a different network/operator.

Figure 3:
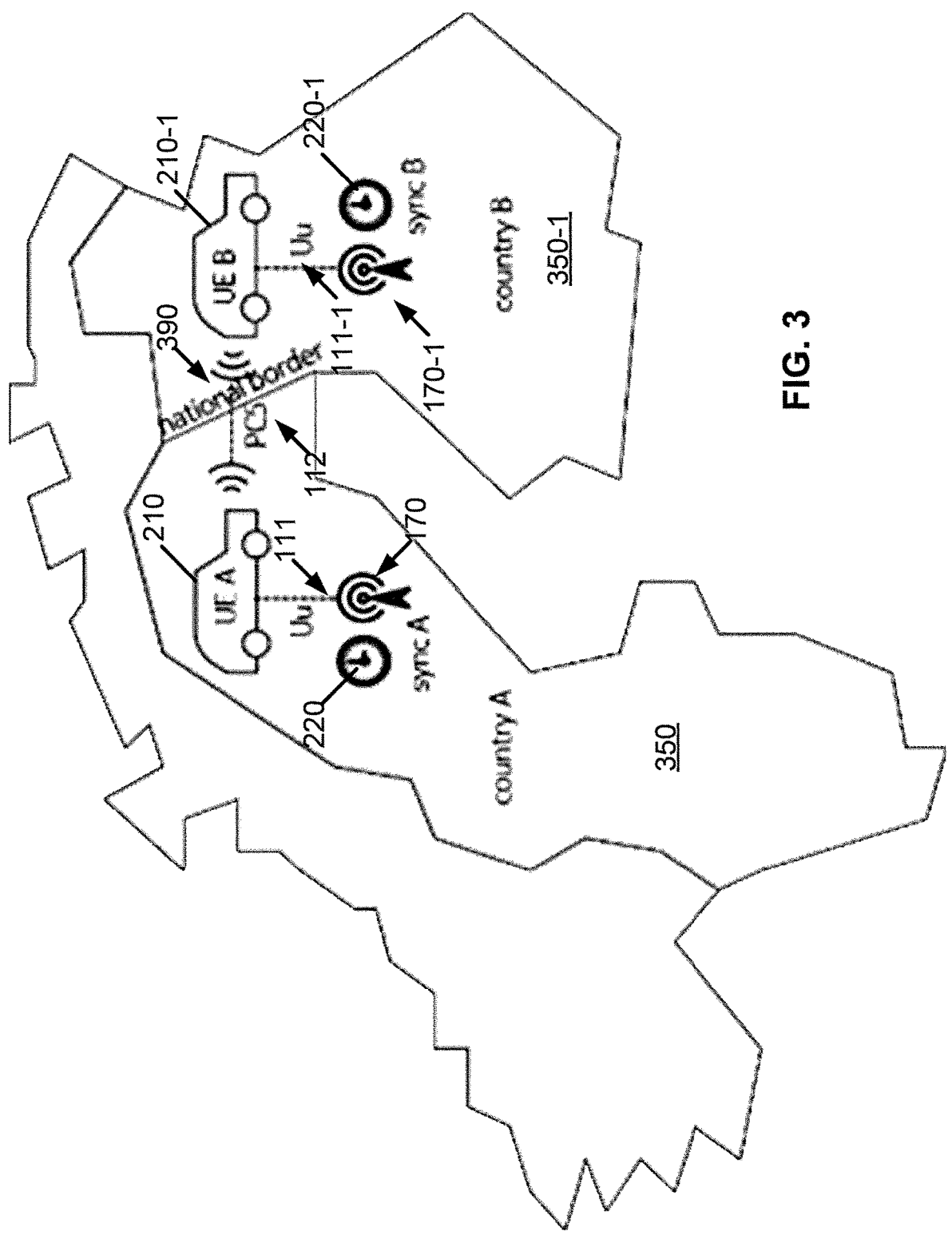
FIG. 3 illustrates a cross-border problem in a V2X scenario where at least two UEs are connected to different PLMNs and want to communicate over a sidelink (PC5 interface)

A similar situation may arise when at least one of the UEs 110 is crossing a national border 390 and is roamed to the V-PLMN of the country 350-1 it has just entered (after leaving country 350). See FIG. 3. This uses the previous figure, but applied to a cross-border problem. For the cross-border use case, the UEs 110 can even be subscribed to the same operator, but when at least one of the UEs traverse a national border 390, this UE will be reconnected (assuming national roaming agreements exist for the subscription) to another PLMN (and corresponding RAN) while the other UE(s) is/are still in the H-PLMN of the country 350 of origin. The V-PLMN in the neighboring country 350-1 will use its own RAN with its own clock reference.

The problem comprises all situations of V2X UEs using different synchronization sources, regardless of the reason that causes the lack of synchronization between two (or more) UEs. The problem of different synchronization sources has been discussed in the last RAN2 #108 meeting (see R2-1916465, "Reply LS on sidelink synchronization under multiple synchronization sources with different timing", 3GPP TSG RAN WG2 #108, Reno, USA, 18-22 Nov. 2019) and an LS (response to R2-1914340=R4-1912826, "LS on sidelink synchronization under multiple synchronization sources with different timing", 3GPP TSG RAN WG2 #108, Reno, USA, 18-22 Nov. 2019 and 3GPP TSG-RAN WG4 #92bis, Chongqing, China, 14-18 Oct. 2019) has been send from RAN4 TSG that covers the following three scenarios:

1) UE1 and UE2 synced to two different gNBs, but the two gNBs are with different timing;

2) UE1 and UE2 synced to two different eNBs, but the two eNBs are with different timing; and 3) UE1 synced to eNB, UE2 synced to gNB, eNB and gNB are with different timing.

RAN4 has asked RAN2 to check if there is any signaling available for timing adjustment in the above scenarios, where multiple gNBs/eNBs with different timing are presented.

In 3GPP, different synchronization options have been defined for V2X and are shown in the table below with their priority. As per the 3GPP standard, the UE in sidelink is preconfigured to prioritize either GNSS or eNB/gNB.

| GNSS-based synchronization | gNB/eNB-based synchronization |
| --- | --- |
| P0: GNSS | P0': gNB/eNB |
| P1: UE directly synchronized to GNSS | P1': UE directly synchronized to gNB/eNB |
| P2: UE indirectly synchronized to GNSS | P2': UE indirectly synchronized to gNB/eNB |
| P3: gNB/eNB | P3': GNSS |
| P4: UE directly synchronized to gNB/eNB | P4': UE directly synchronized to GNSS |
| P5: UE indirectly synchronized to gNB/eNB | P5': UE indirectly synchronized to GNSS |
| P6: the remaining UEs have the lowest priority | P6': the remaining UEs have the lowest priority |

However, a different problem is considered herein: V2X UEs in-coverage and in RRC connected mode that are already synchronized to their corresponding eNB/gNB. So, the problem of non-synchronicity between different base stations has not been dealt with in V2X as recognized by the automotive industry in (see RP-193084, "Rel-17 sidelink for V2X-Automotive Perspective Challenges", 3GPP TSG RAN Meeting #86, Sitges, Spain, Dec. 9-12, 2019) and put up to discussion in the last 3GPP RAN plenary #86.

So far in 3GPP V2X RAN2 "notes currently there is no signalling in the RAN2 specification specifically designed to address the three scenarios described. RAN2 kindly asks RAN1 to provide guidance on the async RAN nodes (including eNB and gNB) issue and whether/what RAN2 signalling is required" (see R2-1916465).

By contrast with the description above, the exemplary embodiments herein address these and other issues. An overview is presented now and additional details are presented below.

Exemplary embodiments herein comprise an apparatus and method to help ensure uninterrupted sidelink communication between UEs when at least one UE is crossing a border and thus changing its synchronization source (e.g., caused by transition from H-PLMN/H-RAN to V-PLMN/V-RAN). Exemplary embodiments are based on a signaling flow between UEs and the network to exchange related signaling messages triggered by the imminent transition of at least one of the UEs changing its synchronization source (e.g. the new gNB) caused by one of the following:

1) crossing a national border;
2) transition from H-PLMN to V-PLMN (where H-PLMN and V-PLMN have different RANs);
3) at least one UE performing handover to a new cell with the new cell having a different synchronization;
4) at least one UE performing handover to a new cell with the new cell belonging to another RAN (national roaming); or
5) UEs connected to different PLMNs (and corresponding RANs) due to subscription to different operators.

In one example embodiment, after at least one UE is detecting a neighboring cell with better radio signal strength and has sent an event-triggered measurement report to its source eNB/gNB, that UE informs its peer UE(s) by sending a signaling message (e.g., SLSyncChangePreparation) over PC5 to inform its peer UE(s) about the planned transition that is shortly going to happen. The reception of the SLSyncChangePreparation message by the peer UE(s) is forwarded to higher layers, in order to make the V2X application layer aware of the soon to be expected handover procedure that may cause some sidelink degradation of QoS. In response to the reception of the preparation message SLSyncChangePreparation, the V2X application layer may undertake pre-emptive measures on the application level to absorb an eventual temporary service degradation (e.g., increasing application data buffer, increasing safety distance in vehicle platoons, slowing vehicles down, sending CAM warning message(s), and the like).

In another example embodiment, the UE sending the SLSyncChangePreparation message starts a newly introduced timer, referred to herein as Txxx. The timer Txxx is configurable. The network can configure the maximum value of Txxx that reflects either the local scenario (e.g., a certain main road crossing a border with known time to perform cross-border roaming) or the specific V2X service requirements determined by the V2X application. This example assumes the timer Txxx is decremented from a pre-defined value, although other options are possible (e.g., incrementing from zero to the pre-defined value).

The UE in the process of crossing the border (e.g., the UE which has sent SLSyncChangePreparation to inform its peer UE(s)) will be instructed by its source eNB/gNB to perform a handover to another cell that has different synchronization (e.g., indicated by including MobilityControlInfo in an RRCConnectionReconfiguration message). In this example, the message alerts the UE that the synchronization source is about to change. Another possibility is that the UE directly monitors the SSB broadcasted from another cell/target cell. However, that necessitates two RF frontends, so that the UE continues communication (sending/transmitting) with clock 1 (i.e., the UE stays in-synch with clock 1) and with the second RF front-end(s), the UE monitors other SSBs from other cells. That is, if the UE itself wants to check if a neighboring cell is using a different synchronization the UE needs to scan the SSBs (Synchronization Signal Blocks, which are beam reference signals) of the neighboring cell(s). Since the UE is still connected to the "old" cell and maintains the communication link to the "old" cell, this monitoring operation is not so straightforward without losing the synchronization to the "old" cell. For this independent monitoring operation, the UE needs an additional RF front-end, which could just be used for monitoring neighboring SSBs (this assumption might be valid for multi-SIM, or some dual-modem type with 2 RF frontends).

In another example embodiment, the UE in transition sends a SLSyncChangeReconfiguration message to its peer UE(s) (e.g., using the "old" synchronization and RRC configuration) prior to performing a RACH procedure in a new cell. The SLSyncChangeReconfiguration message may contain information on how peer UE(s) synchronize to the new synchronization source. The description below describes four exemplary different methods to resynchronize the peer UE(s) (while still being in its own cell) on the clock reference used by the first UE that has entered the new cell across the border.

The information in SLSyncChangeReconfiguration in an exemplary embodiment comprises PC5 absolute signaling using new SL-SSB. In this example, the SLSyncChangeReconfiguration may contain an IE indicating that a new SL-SSB will be transmitted by the UE in transition (e.g., by a UE that has obtained a new clock reference after RACH procedure; in the example UE-1) over PC5. In this case, the information in SLSyncChangeReconfiguration specifies on which resources the peer UE(s) will receive the SL-SSB. SL-SSB is transmitted by UE-1 over PC5.

In another example embodiment, the peer UE(s) can send optionally a feedback message SLSyncChangeReconfigurationFailure in case, e.g., the peer UE cannot perform a resynchronization. The reason for the SLSyncChangeReconfigurationFailure can be manifold: e.g., the controlling eNB/gNB-A for mode-1 UE(s) does not allow resynchronization; there is ongoing uplink over Uu which prohibits resynchronization; the UE cannot receive a new SL-SSB on the indicated resources; and the like.

When the peer UE(s) has/have finished the resynchronization process over sidelink, it/they will send in an exemplary embodiment a SLSyncChangeReconfigurationComplete message over PC5 using the new clock reference of eNB/gNB-B. When the border-crossing UE has received the SLSyncChangeReconfigurationComplete message, a timer Tyyy may be stopped. Note that the timer Tyyy is assumed to decremented from a pre-defined value, although other operations are possible. Operation of timer Tyyy is discussed below.

As an additional example embodiment, assuming that the UE has two clock sources, the below information could also be included in the message. Such assumption is valid in the case that the vehicle is equipped with a Multi-SIM UE or has an RF front-end supporting multiple clock references.

For this case that UEs are either multi-SIM capable devices or have RF frontend(s) that can have multiple clock references, three other exemplary methods to resynchronize the peer UE(s) include the following.

a) PC5 delta signaling using MAC CE. In this example, SLSyncChangeReconfiguration contains an IE that is informing the peer UE(s) over PC5 and indicating that the time difference between old and new synchronization source is carried in a SLSyncDiff MAC CE. As a further part of this example, while using one connection towards the old cell or alternatively the UE maintains the clock reference of the old cell in the UE internally, and another reference towards the new cell, this time difference can be measured by the UE.

b) N32 (or X2/Xn) absolute signaling using new SSB over Uu. In this example, the SLSyncChangeReconfiguration contains an IE indicating where the peer UE(s) can receive a V2X-specific new SSB from its own cell (gNB/eNB-A), transmitted by their corresponding eNB/gNB over Uu on specified resources.

c) N32 (or X2/Xn) delta signaling using MAC CE over Uu. This an example where SLSyncChangeReconfiguration contains an IE that is informing the peer UE(s) that it/they will receive a SLSyncDiff MAC CE containing a time difference between old and new synchronization source a from it/their corresponding eNB/gNBs over Uu.

Figures 4B, 4C:
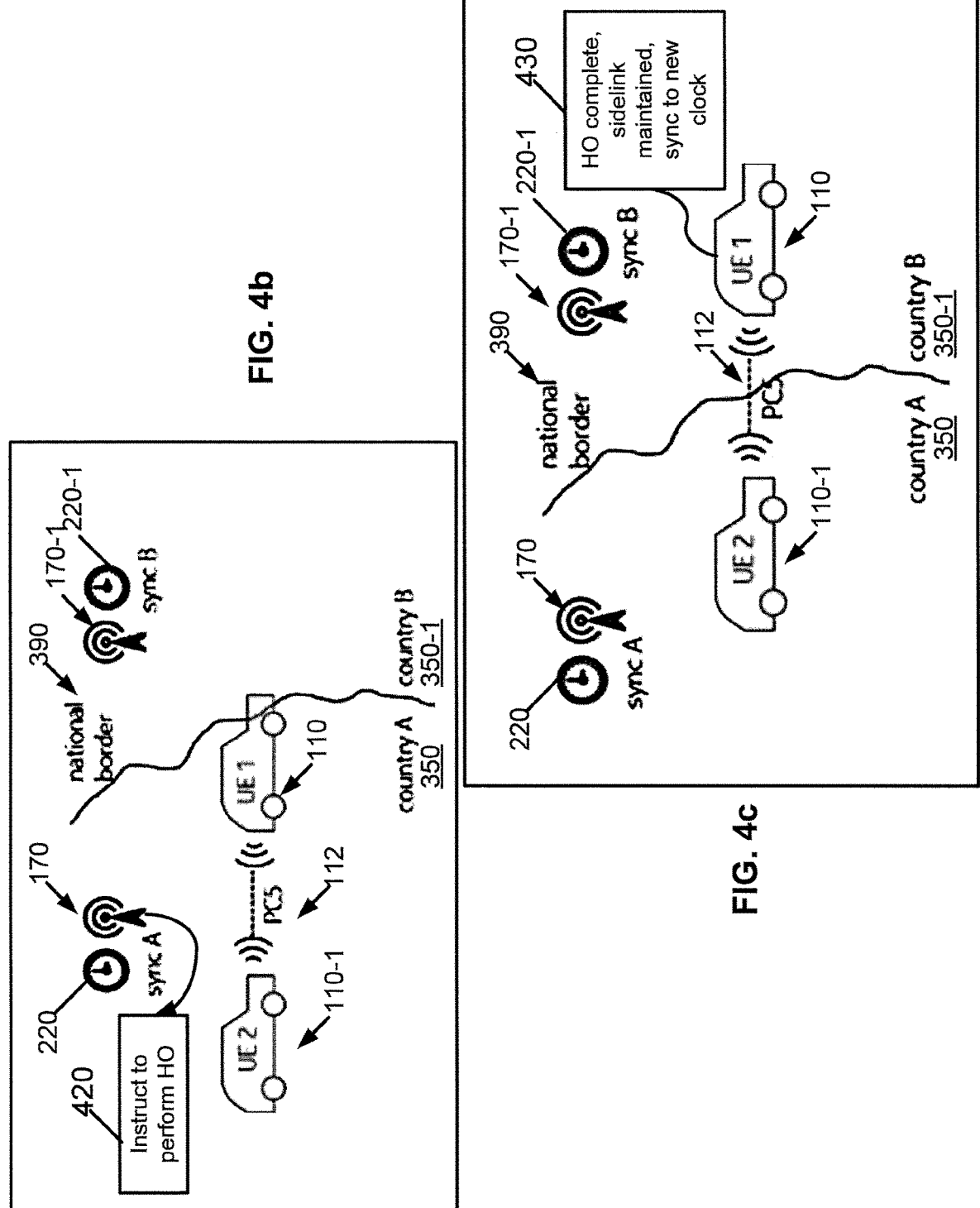

Now that an overview has been presented, additional details are presented. FIGS. 4*a*-*c* illustrate the change in scenario while the first UE is crossing the border. FIGS. 5-10 show the signaling flow in various implementation options. In the signaling flow schematics the following are used: a solid line type indicates the old clock reference; a dashed line type indicates a new clock reference; Network-1 is the H-PLMN in the country of origin; Network-2 is the V-PLMN in the new country; UE-1 is the first UE transitioning across the border into the new network-2; and UE-2 is the UE staying in the old network.

An introduction will be given for FIGS. 4*a*, 4*b*, 4*c*, and 5-11, and then more details about a general scheme will be presented. The details will also incorporate these figures. These figures illustrate the operation of exemplary methods, a result of execution of computer program instructions embodied on a computer readable memory, functions performed by logic implemented in hardware, and/or interconnected means for performing functions in accordance with exemplary embodiments.

Turning to FIGS. 4*a*, 4*b*, and 4*c*, these figures are used to illustrate how a UE (UE 1) maintains a sidelink communication while crossing a national border, in an exemplary embodiment. In this set of figures, UE 1 is transitioning over the border while maintaining sidelink communication. In FIG. 4*a*, the UE 1 110 detects a neighbor cell (from RAN node 170-1) and sends a SLSyncChangePreparation message over PC5 via sidelink 112. See block 410. In FIG. 4*b*, the source base station (RAN node 170) instructs the target base station (RAN node 170-1) and UE-1 to perform a handover (HO). See block 420. In FIG. 4*c*, the UE-1 has completed the HO while maintaining sidelink communication with UE-2 that is resynchronized to new clock reference. See block 430.

Figure 5:
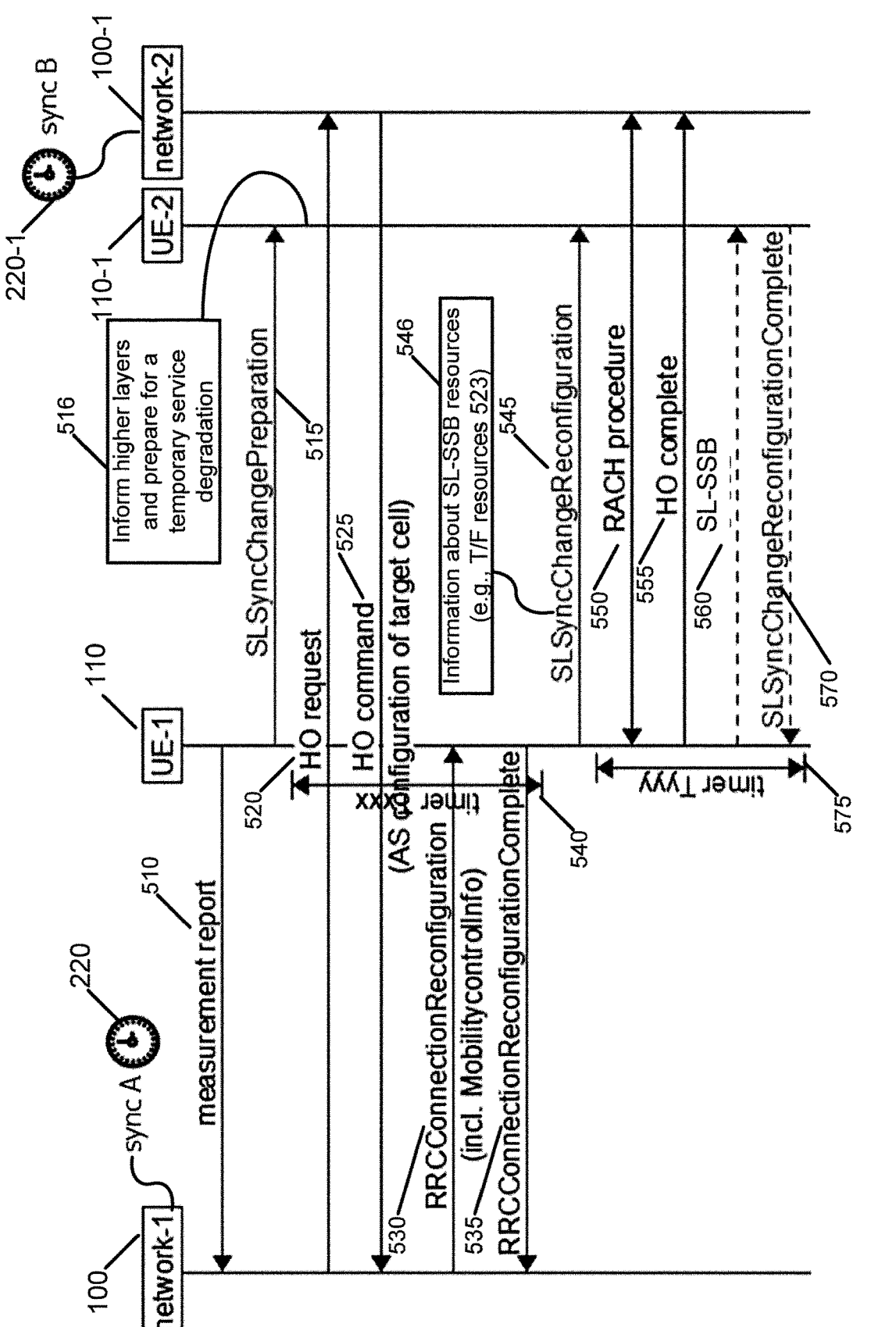
FIG. 5 is a signaling flow diagram with an option referred to as "option-a", which is PC5 absolute signaling using SL-SSB, in an exemplary embodiment.

Referring to FIG. 5, this figure is a signaling flow diagram with an option referred to as "option-a", which is PC5 absolute signaling using SL-SSB, in an exemplary embodiment. The UE-1 110 sends a measurement report 510 in signaling to the network-1 100. The network-1 100 includes RAN node 170, which will likely perform the operations in this and other figures. However, other network nodes may be involved or used in place of RAN node 170. The current clock being used is clock 220, illustrated as sync A, and corresponding to the network-1 100 (e.g., a gNB or another RAN node 170). One exemplary assumption (which is what is typical for real-life deployments) is that the UEs are single RF front-end UEs, although multiple RF front-end UEs are possible.

In additional detail and as a brief overview, in response to a certain trigger has been reached telling the network that the UE has observed a signal in a neighboring cell that is better than the signal in its own cell, the UE sends the measurement report. The UE informs its peer UEs that an "SL-Sync-Change" can happen. There is, however, this is no guarantee that a synchronization change will definitely happen. From a traffic safety perspective, the preparation message does not harm and the higher layers (e.g., in the peer UEs 110-1) will decide how to react upon the reception of the SLSync-ChangePreparation message. Depending on the criticality and QoS requirement of the service(s), the application layer can decide to put some pre-emptive, precautious measures in place or just do nothing if a service interruption is acceptable. The final confirmation that a SL synchronization change is going to happen is signaled by the SLSyncChangeReconfiguration message.

In accordance with this overview, the UE-1 110 sends an SLSyncChangePreparation message 515 in signaling to the UE-2 110-2 over PC5 sidelink 112 to inform its peer UE(s) about the planned transition that might be shortly going to happen.

In block 516, the UE-2 110-1 informs higher layers such as the AS layer and V2X application layer and prepares for a temporary service degradation. The MAC layer may be the layer that responds to the reception of the SLSync-ChangePreparation message and informs the higher layers. As previously described, the reception of the SLSync-ChangePreparation message by the peer UE(s) is forwarded to higher layers, in order to make the V2X application layer aware of the soon to be expected handover procedure that may cause some sidelink degradation of QoS. In response to the reception of the preparation message SLSync-ChangePreparation, the V2X application layer may undertake pre-emptive measures on the application level to absorb an eventual temporary service degradation (e.g., increasing application data buffer, increasing safety distance in vehicle platoons, slowing vehicles down, sending CAM warning message(s), and the like).

The network-1 110 sends a HO request message 520 to the network-2 100-1. The network-2 100-1 includes RAN node 170-1, which will likely perform the operations in this and other figures. However, other network nodes may be involved or used in place of RAN node 170-1. The network-2 100-1 is synchronized to clock 220-1, illustrated as sync B. The network-2 100-1 sends HO command message 525 which includes in this example an AS configuration of the target cell (e.g., a cell formed by network-2). In response to reception of the HO command message 525, the network-1 110 sends an RRCConnectionReconfiguration message 530, which includes mobility control information (MobilityControlInfo) toward the UE-1 110. The UE 110 responds with an RRCConnectionReconfigurationComplete message 535. The UE knows it is changing its synchronization source when the UE receives the RRCConnectionReconfiguration message (which then includes the IE of MobilityControlInfo) informing the UE to perform a complete RACH procedure on the target cell. The source cell itself knows the synchronization source will change from the HOCommand 525 containing RRCReconfiguration information of the target cell.

During this process, the timer Txxx 540 has been started and has expired. This timer is started in response to sending the SLSyncChangePreparation message 515 and stopped in response to the RRCConnectionReconfigurationComplete message 535 being received.

The UE-1 110 sends an SLSyncChangeReconfiguration message 545 to the UE-2 110-1. The SLSyncChangeReconfiguration message 545 comprises information 546 about the new SL-SSB, such as indication as to the resources where the new SL-SSB will be received (see SL-SSB synchronization process 560). This could indicate, for instance, that the UE-2 will get a new synchronization signaled via an SL-SSB from UE-1 over PC5 on frequency-time (T/F) resources 523. In terms of which resources over the sidelink are used by the UE 110 to communicate with peer UEs 110-1, either different resources may be used for different peer UEs or the same resources for different peer UEs. In mode 1 (UE in RRC-CONNECTED and in-coverage), the network configures the SL resources and will try to use orthogonal resources, i.e., each peer UE gets different resources assigned for sidelink. In mode 2, however, there are just preconfigured resource pools that are identical for different UEs (which creates a well-known problem of resource collisions in sidelink for mode 2).

The UE-1 110 performs RACH procedure 550 in order to connect to network-2 100-1. During this RACH procedure 550, the UE decodes the new SSB (i.e., the UE synchronizes to the new clock provide by new SSB). This allows the UE to synchronize to the new clock 220-1. In response to completion of the RACH procedure 550, the UE-1 100 sends a HO complete message 555 to the network-2 100-1.

The UE-1 gets its timing information for the new clock during the RACH procedure 550. However, before UE-1 synchronizes to the new SSB (so before the UE performs the RACH procedure), the UE-1 needs to send the SLSyncChangeReconfiguration message 545 to the peer UE(s) with the old synchronization, because the peer UE(s) just understand messages sent on the "old" clock.

Thus, the signaling for messages 510-555 use the clock 220 in network-1 100. The UE-1 110 performs an SL-SSB synchronization process 560 with the UE-2 110-1 using the clock 220-1 in network-2 100-1. The UE-2 110-1 uses the information 546 to determine the resources to receive the SL-SSB and perform the SL-SSB synchronization process 560. The signal used for synchronization is the (SL-)SSB, but the actual source of synchronization is the network (e.g., gNB), from which the signal originates. The UE-2 110-1 responds with an SLSyncChangeReconfigurationComplete message 570, also using the clock 220-1 in network-2 100-1.

During this process, the timer Tyyy 575 is used in this example. This timer is started in response to the sending of the SLSyncChangeReconfiguration message 545 and is stopped in response to reception of the SLSyncChangeReconfigurationComplete message 570.

Figure 5A:
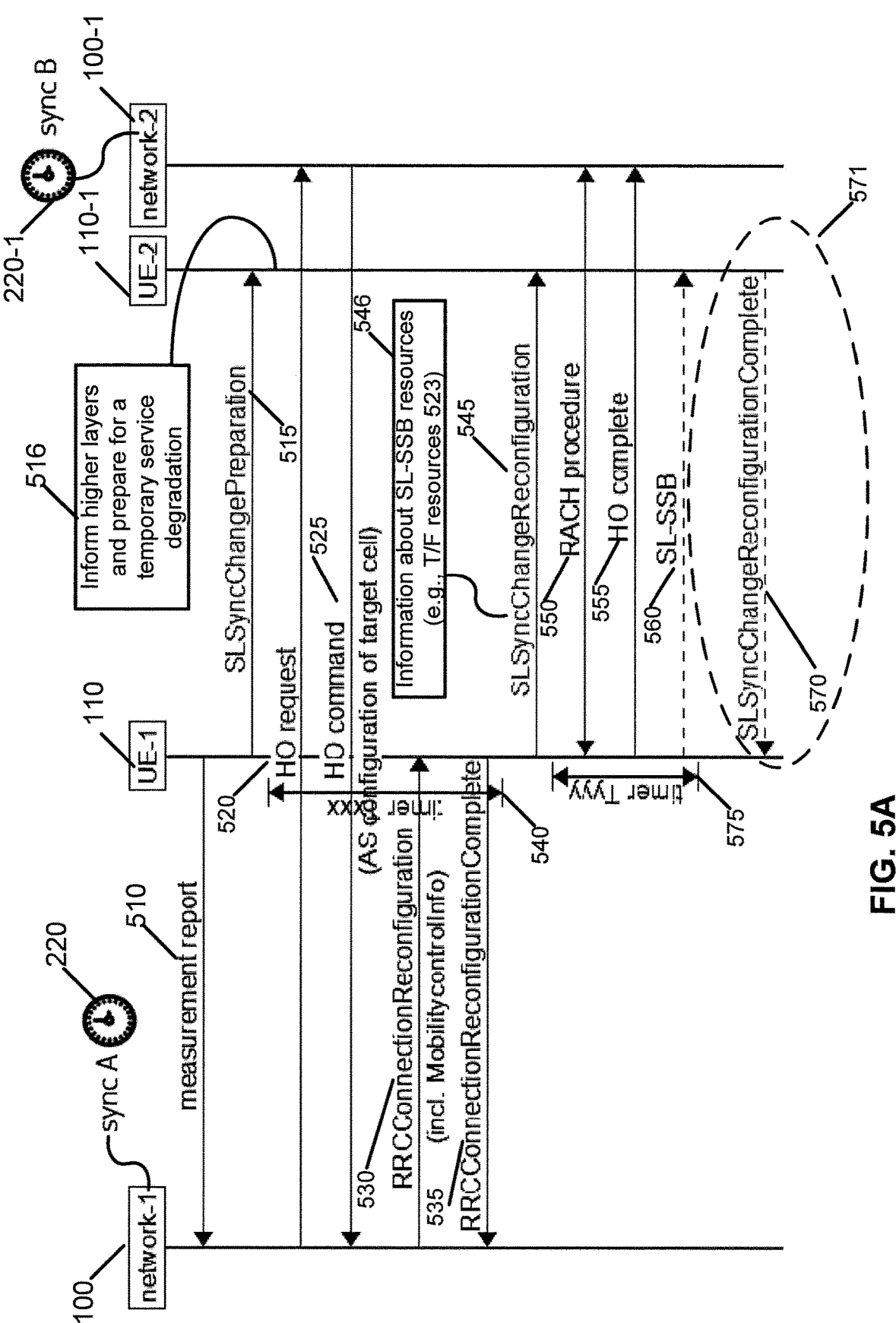
FIG. 5A similar to FIG. 5, except that timer Tyyy expires prior to synchronization completion, in an exemplary embodiment.

For FIGS. 5A-10, these figures use signaling from the previous figure, so mainly the differences in signaling between figures will be described. Turning to FIG. 5A, this figure similar to FIG. 5, except that timer Tyyy expires prior to synchronization completion, in an exemplary embodiment. Two examples are illustrated. In one example, the timer Tyyy expires after the SL-SSB synchronization process 560, and no later SLSyncChangeReconfigurationComplete message 570 is received (that is, reference 571 would not occur). In another example, the timer Tyyy expires after the SL-SSB synchronization process 560 and, at some point later, the SLSyncChangeReconfigurationComplete message 570 is received (that is, reference 571 does occur).

Tyyy expiry may be interpreted as the second UE-1 110-1 could not successfully resync to the new synchronization source in time and hence the sidelink is considered to be interrupted. When Tyyy has expire, the UEs could try a re-establishment procedure (not shown) or wait until the UE-2 has also crossed the border and finally both UEs are within the same RAN node (i.e., and have single synchronization source). Theoretically there could also be the case, illustrated by reference 571, that Tyyy expires but later on the SLChangeReconfigurationComplete message is received. This could be addressed as described previously, such that a re-establishment procedure or waiting is performed, regardless of the reception of the message. As other options, the UE-1 110 can make another choice, such as to not perform the re-establishment procedure, if the re-establishment procedure has not been started, or to not wait and instead (re) start communications with the UE-2.

Figure 6:
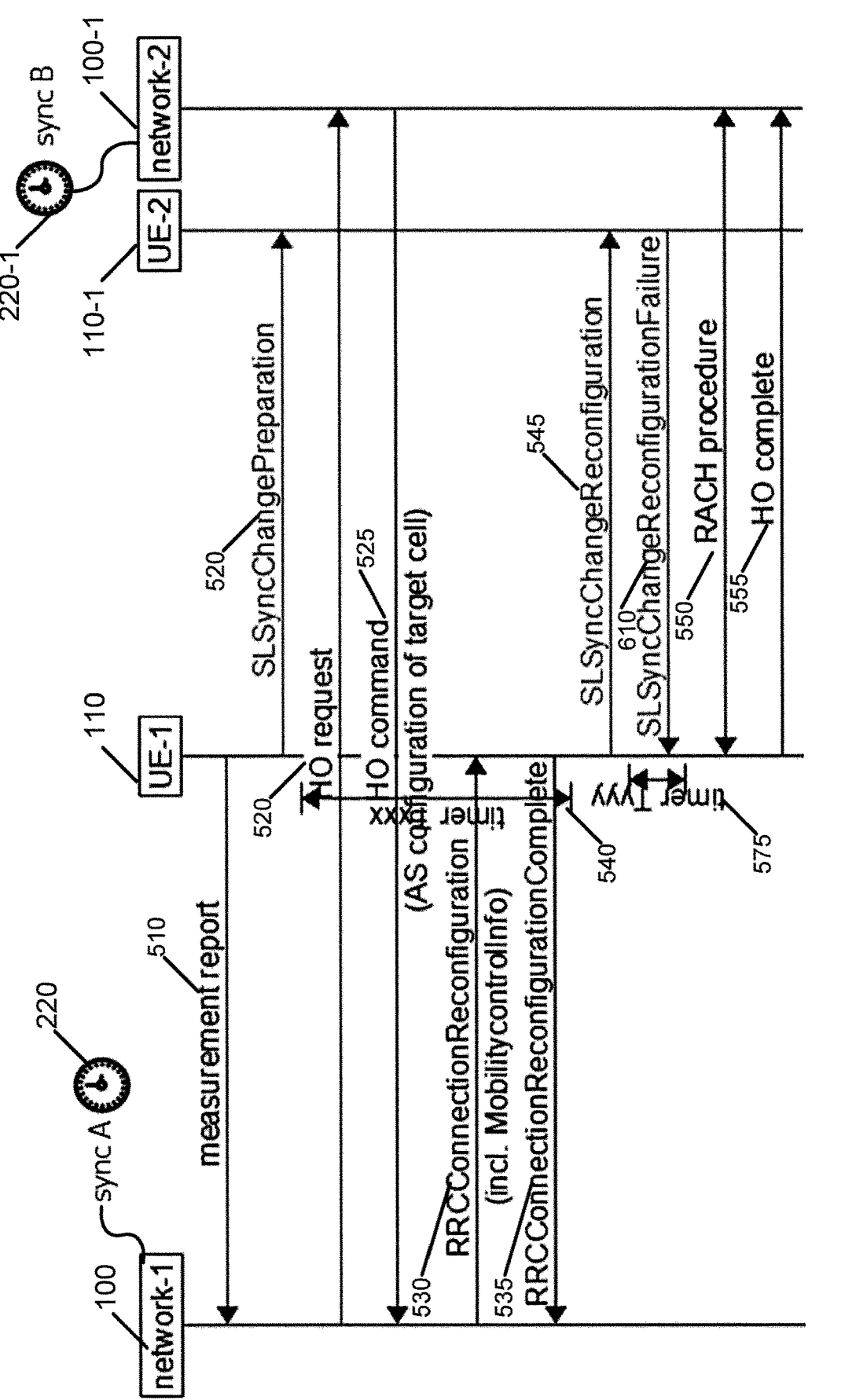
FIG. 6 is a signaling flow diagram with option-a (PC5 absolute signaling using SL-SSB) with peer UE feedback via SLSyncChangeReconfigurationFailure message (using "old" clock reference), in an exemplary embodiment.

Referring to FIG. 6, this figure is a signaling flow diagram with option-a (PC5 absolute signaling using SL-SSB) with peer UE feedback via SLSyncChangeReconfigurationFailure message (using "old" clock reference), in an exemplary embodiment. The flow in FIG. 6 is similar to the flow in FIG. 5, until the UE-2 110-1 responds with an SLSyncChangeReconfigurationFailure message 610 to the UE-1 110. The UE-2 110-1 sends the SLSyncChangeReconfigurationFailure message 610 using the "old" clock reference of clock 220. The UE-1 110 performs RACH procedure 550 in order to connect to network-2 100-1. In response to completion of the RACH procedure 550, the UE-1 100 sends a HO complete message 555 to the network-2 100-1. In this example, the timer Tyyy 575 ends in response to the reception of the SLSyncChangeReconfigurationFailure message 610. It should be noted that the UE-2 110-1 might still synchronize successfully to the new network. The failure message 610 indicates only that the peer UE 110-1 cannot perform the resynchronization (UE-2 cannot resynchronize) at that time. As a consequence, the sidelink will be interrupted.

Figure 7:
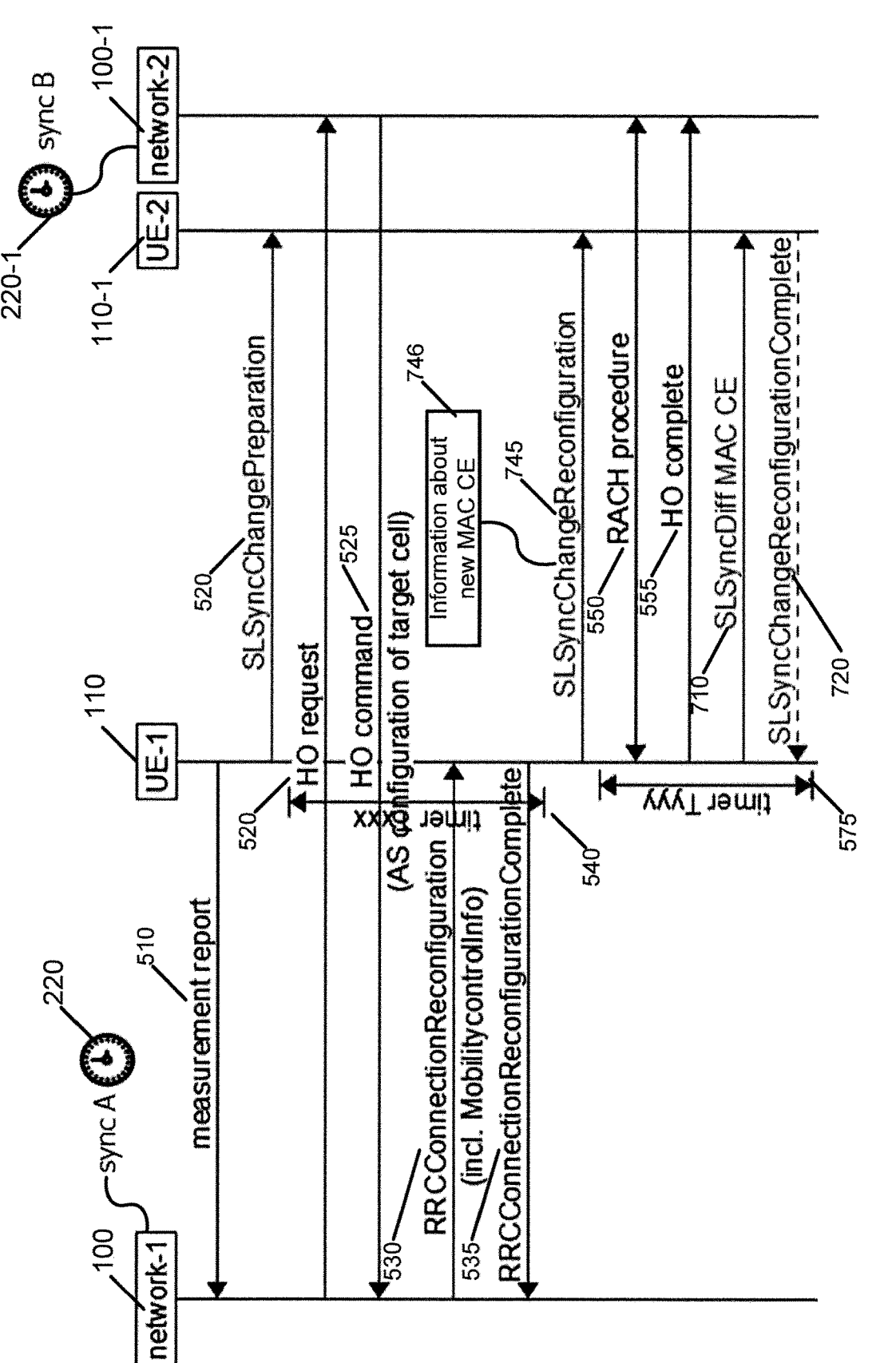
FIG. 7 is a signaling flow diagram with an option referred to as "option-b", which is PC5 absolute signaling using MAC-CE, in an exemplary embodiment.

Turning to FIG. 7, this figure is a signaling flow diagram with an option referred to as "option-b", which is PC5 absolute signaling using MAC-CE, in an exemplary embodiment. The signaling in the example of FIG. 7 is similar to that in FIG. 5 until after the message 535. A similar SLSyncChangeReconfiguration message 745 is sent (similar to message 545), except there is information 746 about the new MAC CE, such as resources to be used for reception of the MAC CE. In other words, the SLSyncChangeReconfiguration message does not contain the SLSync MAC CE, but instead indicates at least the resources on which the new MAC CE will be transmitted (but the MAC CE itself can only be sent after UE-1 has performed RACH procedure and synchronized to the new cell). Signaling for references 550 and 555 has been previously described. At this point, the UE-1 110 sends an SLSyncDiff MAC CE message 710 to the UE-2 110-1. This signaling is performed using the "old" clock 210 and using the resources already send in message 745. The SLSyncDiff MAC CE message 710 indicates at least a time difference between the first and second synchronization source. The UE-2 110-1 adjusts timing by the second user equipment for the sidelink based on at least the time difference. The UE-2 110-1 responds with an SLSyncChangeReconfigurationComplete message 720 to the UE-1 110. This signaling is performed using the "new" clock 210-1. The timer Tyyy 575 is ended in response to the reception of the SLSyncChangeReconfigurationComplete message 720.

Figure 8:
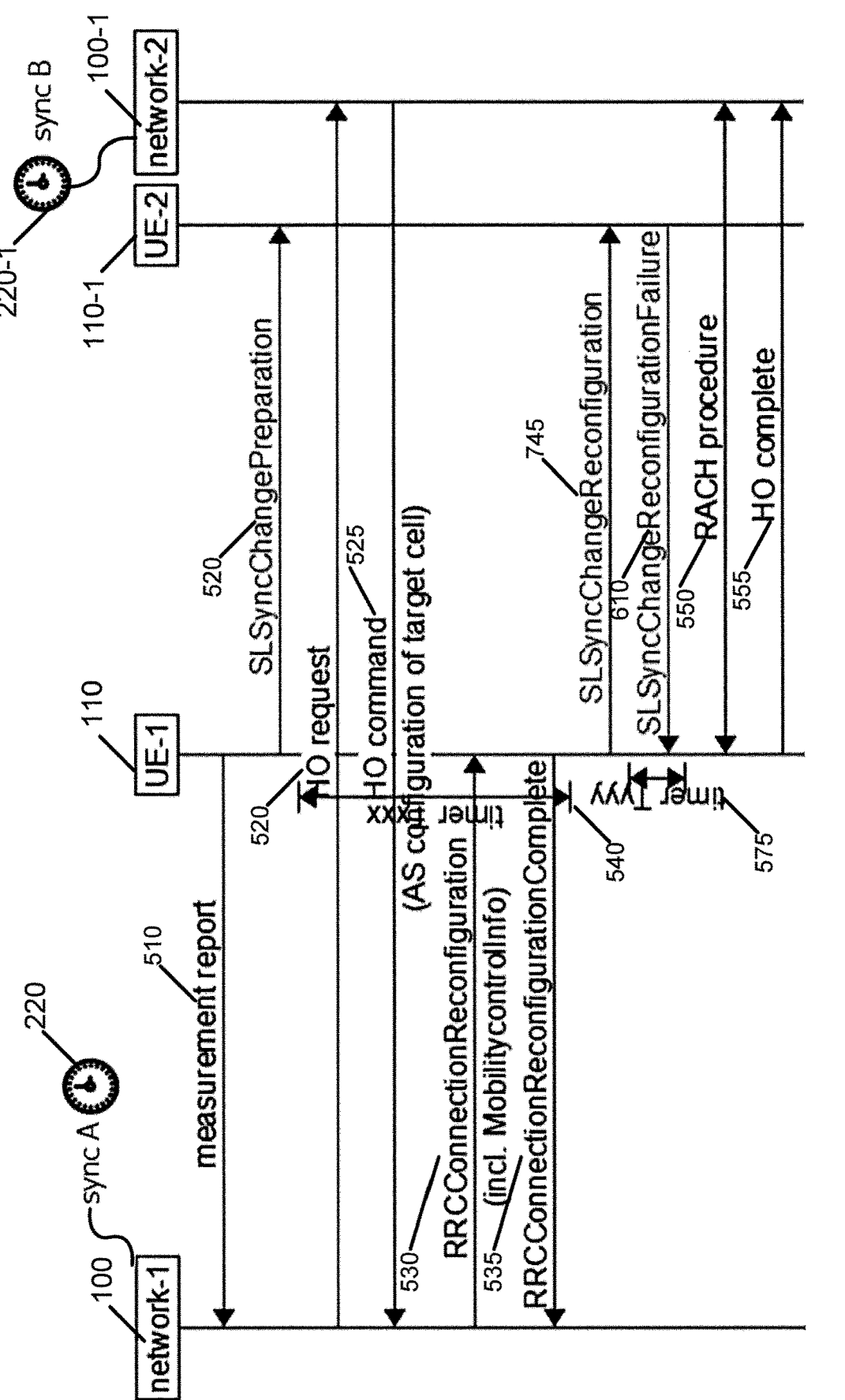
FIG. 8 is a signaling flow diagram with option-b (PC5 absolute signaling using MAC-CE) with feedback from peer UE via SLSyncChangeReconfigurationFailure message (using "old" clock reference), in an exemplary embodiment.

FIG. 8 is a signaling flow diagram with option-b (PC5 absolute signaling using MAC-CE) with feedback from peer UE via SLSyncChangeReconfigurationFailure message (using "old" clock reference), in an exemplary embodiment. The signaling in FIG. 8 is similar to the signaling in FIG. 7 until after the SLSyncChangeReconfiguration message 545. At this point, the UE-2 110-1 sends the SLSyncChangeReconfigurationFailure message 610 using the "old" clock reference of clock 220. The UE-1 110 performs RACH procedure 550 in order to connect to network-2 100-1. In response to completion of the RACH procedure 550, the UE-1 100-1 sends a HO complete message 555 to the network-2 100-1. In this example, the timer Tyyy 575 ends in response to the reception of the SLSyncChangeReconfigurationFailure message 610. As stated previously, the UE-1 may still be able to synchronize to the new network.

Figure 9:
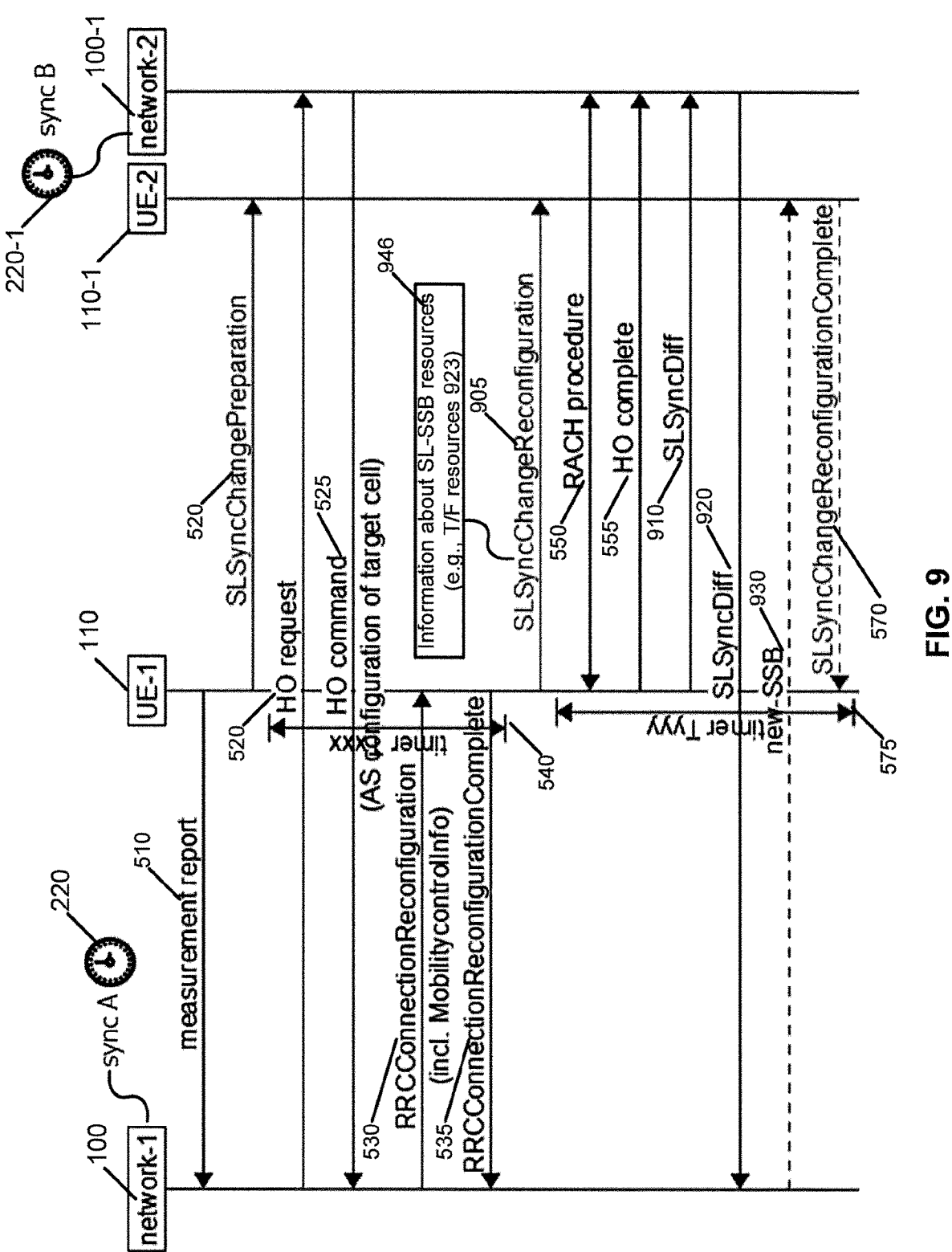
FIG. 9 is a signaling flow diagram with an option referred to as "option-c", which is N32/X2/Xn absolute signaling using new SSB over Uu, in an exemplary embodiment.

Turning to FIG. 9, this figure is a signaling flow diagram with an option referred to as "option-c", which is N32/X2/Xn absolute signaling using new SSB over Uu, in an exemplary embodiment. The signaling flow in FIG. 9 is similar to the flow in FIG. 5, although the SLSyncChangeReconfiguration message 905 (similar to the message 545) contains information 946 for the new-SSB that is used in signaling 930. Other than this, the signaling flow in FIG. 9 is similar to the flow in FIG. 5, until after the HO complete message 555. At this point, the UE-1 110 sends an SLSyncDiff message 910 to the network-2 100-1. The message 910 indicates at least a timing difference between the first synchronization source and the second synchronization source. The network-2 100-1, in response, sends an SLSyncDiff message 920 to the network-1 100. The messages through message 920 were all performed using the "old" clock 220. The network-1 100 sends a new-SSB message 930 to the UE-2 110-1 using the "new" clock 220-1. The UE-2 110-1 uses the information in the SLSyncChangeReconfiguration message 905 in order to access the new-SSB signaling 930. Specifically, the UE-2 will get a new synchronization signaled via new SSB from the network 1 on frequency/time resources 923, which has been indicated in block 946. The UE-2 synchronizes to the new clock with the help of the new-SSB. The message is 930 in FIG. 9 contains the synchronization signal content. The process of synchronization is performed at UE-2 after receiving/decoding the message 930. That is, the UE-2 adjusts its timing for the sidelink based on the information indicating at least a time difference between the first and second synchronization source. The UE-2 110-1 sends an SLSyncChangeReconfigurationComplete message 570, also using the clock 220-1 in network-2 100-1.

During this process, the timer Tyyy 575 is used in this example. This timer is started in response to the sending of the SLSyncChangeReconfiguration message 545 and is stopped in response to reception of the SLSyncChangeReconfigurationComplete message 570.

Figure 10:
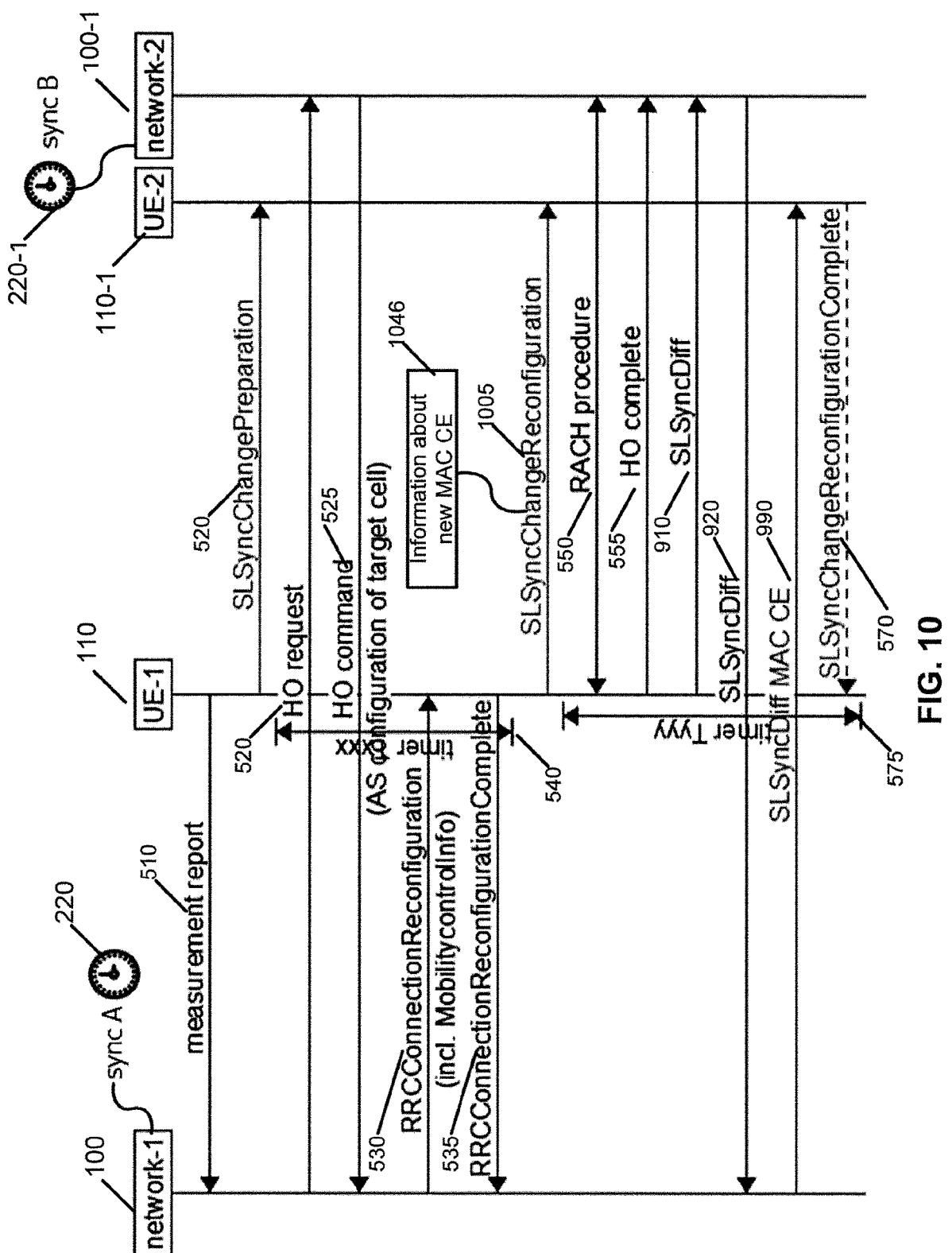
FIG. 10 is a signaling flow diagram with an option referred to as "option-d", which is (N32/X2/Xn relative signaling using SyncDiff MAC CE over Uu, in an exemplary embodiment.

Referring to FIG. 10, this figure is a signaling flow diagram with an option referred to as "option-d", which is (N32/X2/Xn relative signaling using SyncDiff MAC CE over Uu, in an exemplary embodiment. The signaling flow in FIG. 10 is similar to the signaling flow in FIG. 9, although the SLSyncChangeReconfiguration message 1005 (similar to the message 905) contains information 1046 for the SLSyncDiff MAC CE that is used in signaling 990. Other than this, the signaling flow in FIG. 10 is similar to the flow in FIG. 9, until after the SLSyncDiff message 920. At this point the, network-1 100 sends an SLSyncDiff MAC CE message 990 to the UE-2 110-1. The signaling until this point uses the "old" clock 220. The UE-2 110-1 uses the information in the SLSyncChangeReconfiguration message 1005 in order to access the SLSyncDiff MAC CE message 990. The UE-2 110-1, responsive to the message 990, sends toward the UE-1 110 an SLSyncChangeReconfigurationComplete message 570, which uses the clock 220-1 in network-2 100-1.

During this process, the timer Tyyy 575 is used in this example. This timer is started in response to the sending of the SLSyncChangeReconfiguration message 545 and is stopped in response to reception of the SLSyncChangeReconfigurationComplete message 570.

Figures 11, 12:
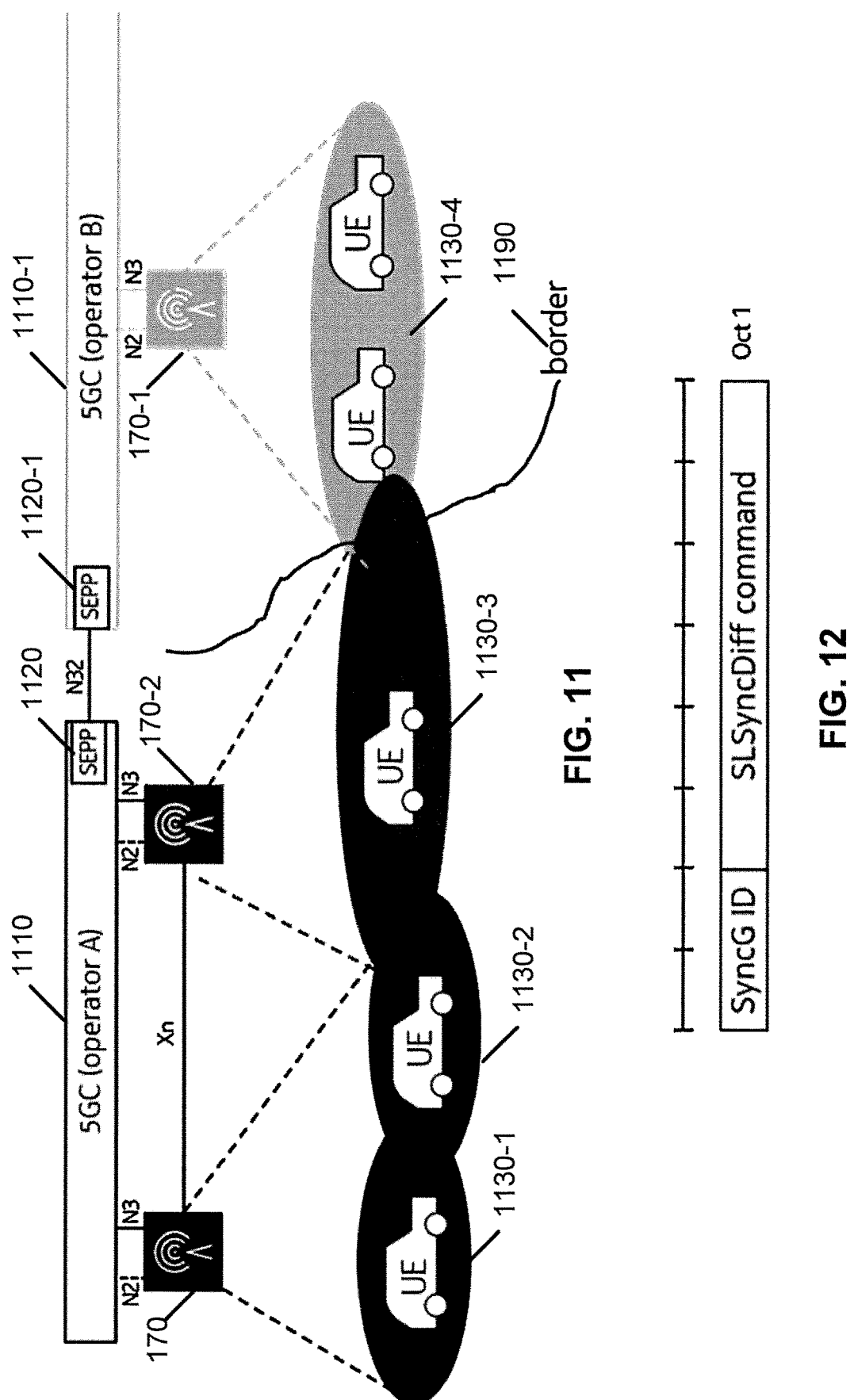
FIG. 11 is an illustration of an N32 interface connecting two PLMNs via an SEPP function, in an exemplary embodiment.
FIG. 12 is an illustration of a SyncDiff MAC CE in an exemplary embodiment.

Referring to FIG. 11, this figure is an illustration of an N32 interface connecting two PLMNs via an SEPP function, in an exemplary embodiment. This example illustrates two 5G core networks (5GC) 1110 and 1110-1, interconnected through corresponding SEPP functions 1120, 1120-1. The RAN nodes 170 and 170-2 are connected to the 5GC 1110 from operator A, and the RAN node 170-1 is connected to the 5GC 1110-1 of operator B. The RAN node 170 forms cells 1130-1 and 1130-2, while the RAN node 170-2 forms cell 1130-3. The RAN node 170-1 forms cell 1130-4. The border 1130 occurs near cell edges of cells 1130-3 and 1130-4. Each RAN node 170 is connected to its corresponding 5GC network via an N2 (control plane, shown dashed) interface and an N3 (user plane, shown solid) interface. The RAN nodes 170 and 170-1 are interconnected through an Xn interface.

Now that an introduction has been provided for FIGS. 4a, 4b, 4c, and 5-11, more details about a general scheme are presented. This scheme refers to these figures and provides multiple examples of V2X communication in cross-operator and cross-border scenarios.

In a first step (see FIG. 4a), the UE-1 110 is approaching the border 390 and since the UE is continuously monitoring the signal strength of the serving and neighbor cells, an event (e.g., A3, A4, and the like) is triggered. Thus, the UE-1 sends a measurement report to its source eNB/gNB-A, which is RAN node 170.

After sending the measurement report, the UE-1 110 sends a SLSyncChangePreparation message 515 to its peer UE(s) over SLRB in RLC AM.

Potentially, the UE-1 110 starts timer Txxx in response to the message 515 either being sent or being generated. The timer Txxx is configurable by the network and can be sent in the existing RRCReconfiguration message as a new IE or in pre-configuration. Txxx should be longer than T304 (T304 is RRCReconfiguration with sync Failure).

The timer Txxx 540 is used to allow higher layers to adapt to the expected temporary change QoS or service level. Txxx allows a V2X application (such as a V2X module 140) to perform pre-emptive measures (e.g., sending warning messages, increasing safety distance, slowing down vehicles, and the like) and/or prepare for a potential service interruption on application layer (e.g., buffering). If the timer Txxx expires, the V2X application layer knows that the RRC reconfiguration of at least one UE in sidelink has failed and an interruption of the V2X service will happen.

The peer UE(s), in response to receiving the SLSyncChangePreparation message 515, forward the SLSyncChangePreparation information to higher layers i.e., a V2X application layer. The consequence that the V2X application layer draws on the reception of the SLSyncChangePreparation message is outside the scope of this disclosure.

The source eNB/gNB-A 170 is initiating a handover and sends a HO request message 525 to the target cell eNB/gNB-B 170-1 followed by a RRCConnectionReconfiguration message 530 including MobilityControlInfo (with sync change, i.e., involving a RA procedure) message to the UE-1.

The UE-1 110 sends RRCConnectionReconfiguration-Complete message 535 to its source eNB/gNB 170 (shown in FIGS. 5-10 as the network-1 100).

After sending a RRCConnectionReconfigurationComplete message 535, the transitioning UE 110 sends SLSyncChangeReconfiguration message 545 to its peer UE(s) 110-1. As mentioned above, one exemplary embodiment for the SLSyncChangeReconfiguration message is to contain PC5 absolute signaling using SL-SSB for the peer to synchronize to the base station.

If started, timer Txxx is stopped in response to the UE-1 110 having either generated or sent the SLSyncChangeReconfiguration message 545, to indicate that the UE in transition (UE-1) has successfully received its new RRC configuration for the new cell.

Potentially, timer Tyyy 575 is triggered when the UE-1 110 has either been generated or sent the SLSyncChangeReconfiguration message.

The timer Tyyy is started to allow for the RACH procedure and for the resynchronization procedure. In case no SLSyncChangeReconfigurationFailure message 610 is used, the timer Tyyy is used instead to detect that the peer UE(s) could not resync to the new synchronization source. That is, in case no SLSyncChangeReconfigurationFailure message 610 is received by the UE-1 110, but there is still a failure to resync (resynchronize) to the new synchronization source (e.g., a lack of SLSyncChangeReconfigurationComplete message), the timer Tyyy 575 indicates this if the timer expires.

When UE-1 has fully completed the handover to the new cell (e.g., via a RACH procedure 550 including, e.g., new clock synchronization; new RCC configuration with new security and session context), the UE-1 110 will send the information about the new synchronization as per the following. In a first example, the UE-1 110 uses PC5 absolute signaling using SL-SSB (FIG. 5). As one possibility for this first example, the SLSyncChangeReconfiguration message 545 may contain a new IE indicating that a new SL-SSB will be transmitted by the UE in transition (UE-1) over PC5. In this case, the new IE in SLSyncChangeReconfiguration specifies on which resources the peer UE(s) will receive the SL-SSB. It is noted that the new SL-SSB should in an exemplary embodiment be sent on resources orthogonal to the conventional SSB broadcasted by the cell. That is, the new SL-SSB sent by the UE should not interfere with the normal SSB sent by the gNB.

As another possibility for this first example, a new SL-SSB may be sent over PC5 from UE-1 (see FIG. 5, SL-SSB synchronization process 560). As a further possibility for this first example, optionally the peer UE can respond with SLSyncChangeReconfigurationFailure message 610 informing the transitioning UE that no resynchronization is possible (see FIG. 6).

Potential other exemplary embodiments may include the PC5 delta signaling with MAC CE (see FIG. 7). In this example, the SLSyncChangeReconfiguration message 545 informs the peer UE(s) over PC5 sidelink 112 that the time difference between old and new synchronization sources is carried in a SLSyncDiff MAC CE message 720. See FIG. 12. The SLSyncDiff MAC CE message may be a one-byte data field (an octet) that contains the difference relative to the old synchronization in multiples of the sampling time, similar to the timing advance MAC CE defined in 3GPP TS 36.321 and 3GPP TS 38.321. The value in the SLSyncDiff field is according to the formula from 3GPP TS 38.133, where the time steps are multiples of the sampling period. An exemplary signaling flow for PC5 delta signaling with MAC CE that includes an optional feedback message (SL-SyncChangeReconfigurationComplete message 720) is shown in FIG. 9.

Another exemplary embodiment includes that illustrated in FIG. 11 for the different cells belonging to the same core network the X2/Xn interface can used as an alternative solution to carry the synchronization information as in FIG. 9 or 10 for the option-c and option-d, respectively. The different cells belonging to different PLMNs via the N32 interface (with SEPP functions 1120, 1120-1 at the borders of each PLMN) can used as an alternative solution to carry the synchronization information as in FIG. 9 or 10 for the option-c or option-d.

Peer UE(s) (in the example, UE-2 110-1) re-synchronize to the new clock source (originating from RAN-B). The peer UE(s) sends the SLSyncChangeReconfigurationComplete message 720 to the UE-1 over PC5 sidelink 112 using the new synchronization and new PC5-RRC reconfiguration. The timer Tyyy is stopped in response to reception of the SLSyncChangeReconfigurationComplete message 720.

In case timer Tyyy 575 expires (i.e., SLSyncChangeReconfigurationComplete has not been received) the UE can choose to go "out of V2X service" and assign mode-2 resources in the exceptional resource pool. Furthermore, the UE-1 110 signals back to the other UEs 110-1 the sequence number and periodicity, chosen i.e., by the latency requirement from the applications on the V2X layer.

Without in any way limiting the scope, interpretation, or application of the claims appearing below, a technical effect and advantage of one or more of the example embodiments disclosed herein is uninterrupted sidelink communication in the advent of change of synchronization source, e.g. when UE is crossing a border. Another technical effect and advantage of one or more of the example embodiments disclosed herein is better reliability in sidelink. Another technical effect and advantage of one or more of the example embodiments disclosed herein is better QoS predictability for cell changes. Another technical effect and advantage of one or more of the example embodiments disclosed herein is smoother transition of sidelink communication when the communication link between vehicles is crossing borders.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

| | |
|---|---|
| 3GPP | third generation partnership project |
| 5G | fifth generation |
| 5GC | 5G core network |
| AM | Acknowledged Mode |
| AMF | access and mobility management function |
| AS | access stratum |
| CAM | cooperative awareness message |
| CE | control element |
| CU | central unit |
| DU | distributed unit |
| eNB (or eNodeB) | evolved Node B (e.g., an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, i.e., the LTE radio access technology |
| gNB (or gNodeB) | base station for 5G/NR, i.e., a node providing NR user plane and control plane protocol terminations towards the UE, and connected via the NG interface to the 5GC |
| GNSS | Global Navigation Satellite System |
| HO | handover |
| H-PLMN | Home PLMN |
| H-RAN | Home RAN |
| IE | information element |
| I/F | interface |
| LTE | long term evolution |

-continued

| | |
|---|---|
| LS | liaison statement |
| MAC | medium access control |
| MME | mobility management entity |
| ng or NG | next generation |
| ng-eNB or NG-eNB | next generation eNB |
| NR | new radio |
| N/W or NW | network |
| PDCP | packet data convergence protocol |
| PHY | physical layer |
| PLMN | Public Land Mobile Network |
| QOS | quality of service |
| RA | random access |
| RACH | random access channel |
| RAN | radio access network |
| RF | radio frequency |
| Rel | release |
| RLC | radio link control |
| RRH | remote radio head |
| RRC | radio resource control |
| RU | radio unit |
| Rx | receiver |
| SDAP | service data adaptation protocol |
| SEPP | Security Edge Protection Proxy |
| SGW | serving gateway |
| SIM | Subscriber Identity Module |
| SL | sidelink |
| SLRB | SL (data) radio bearer |
| SL-SRB | Sidelink Signaling Radio Bearer |
| SLSS | Sidelink Synchronization Signals |
| SMF | session management function |
| SSB | Synchronization Signal Block |
| SL-SSB | Sidelink Synchronization Block |
| SSSS | Secondary Sidelink Synchronization Signal |
| synch | synchronize(d) or synchronization |
| TS | technical specification |
| Tx | transmitter |
| UE | user equipment (e.g., a wireless, typically mobile device) |
| UPF | user plane function |
| V-PLMN | Visited PLMN |
| V-RAN | Visited RAN |

What is claimed is:

1. An apparatus comprising:

at least one processor; and at least one memory including computer program code;

the at least one memory and the computer program code configured to, with the at least one processor, cause the apparatus at least to:

send via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment;

perform by the first user equipment a handover process from a first network access node in a first wireless network to the different network access node in a second wireless network, the second wireless network using the second synchronization source; and attempt by the first user equipment to synchronize the one or more second user equipment to the second synchronization source, wherein the at least one processor and the computer program code are further configured to:

send, prior to performing the handover process, a message from the first user equipment to the one or more second user equipment indicating at least synchronization information for the second synchronization source, wherein the message indicates at least synchronization information for the second synchronization source is performed in response to determining by the first user equipment that the first synchronization source used with the first wireless network is about to be changed to the second synchronization source, wherein:

the synchronization information comprises absolute signaling for the sidelink using a new sidelink synchronization block for the second synchronization source; or the synchronization information comprises an information element indicating that the new sidelink synchronization block will be transmitted by the first user equipment over the sidelink and specifies on which resources the one or more second user equipment will receive the new sidelink synchronization block.

2. The apparatus of claim 1, wherein the at least one processor and the computer program code configured to determine by the first user equipment that the first synchronization source used with the first wireless network is about to be changed comprises the at least one processor and the computer program code configured to determine that the first synchronization source used with the first wireless network is about to be changed in response to reception of a message from the first network indicating mobility control information for the second network.

3. The apparatus of claim 1, wherein:

the at least one processor and the computer program code are further configured to receive by the first user equipment a message from at least one of the one or more second user equipment that there is a synchronization failure by the at least one second user equipment to the second synchronization source; and the handover process comprises a random access channel procedure performed between the first user equipment and the different network access node, wherein the first user equipment receives timing information for the second synchronization source during the random access channel procedure.

4. The apparatus of claim 3, wherein the at least one processor and the computer program code are further configured to:

perform, after the handover is complete, a synchronization process, using timing for the second synchronization source and over the sidelink, by the first user equipment with the one or more second user equipment using one or more resources indicated by the synchronization information for communication over the sidelink with corresponding ones of the one or more second user equipment; and receive by the first user equipment a message from at least one of the one or more second user equipment that synchronization to the second synchronization source is complete.

5. The apparatus of claim 4, wherein the at least one processor and the computer program code are further configured to:

set a timer by the first user equipment and in response to the sending the message indicating at least synchronization information for the second synchronization source; and determine by the first user equipment that synchronization with the second synchronization source has failed for one of the one or more second user equipment in response to the timer having expired prior to synchronization completion for the one second user equipment.

6. The apparatus of claim 3, wherein the at least one processor and the computer program code are further configured to:

send, after the handover is complete, a message by the first user equipment over the sidelink to the one or more second user equipment indicating at least a time difference between the first and second synchronization source.

7. The apparatus of claim 3, wherein the at least one processor and the computer program code are further configured to:

send by the first user equipment a message to the second network indicating a timing difference between the first synchronization source and the second synchronization source; and receive by the first user equipment indication from at least one of the one or more second user equipment that synchronization has been performed to the second synchronization source.

8. An apparatus comprising:

at least one processor; and at least one memory including computer program code;

the at least one memory and the computer program code configured to, with the at least one processor, cause the apparatus at least to:

receive, at a first network access node in a wireless network and from a first user equipment, one or more measurement reports;

perform, based on the one or more measurement reports, a process to handover the first user equipment from the first network access node to a second network access node, wherein the first network access node is in a first wireless network that uses a first synchronization source and the second network access node is in a second network that uses a second synchronization source different from the first synchronization source, and wherein the first user equipment and one or more second user equipment use timing of one of the first or second synchronization sources to maintain a sidelink communication over a sidelink between the first user equipment and the one or more second user equipment; and receive at the first network access node a message from the second network indicating at least a time difference between the first and second synchronization sources; and send one or more messages from the first network access node to the second user equipment to allow the second user equipment to synchronize to the second synchronization source, wherein the at least one processor and the computer program code configured to send the one or more messages comprises the at least one processor and the computer program code configured to:

send timing for the sidelink based on the information for a new synchronization signal block corresponding to the second synchronization source; and send the one or more messages comprises sending information indicating at least a time difference between the first and second synchronization source.

9. An apparatus comprising:

at least one processor; and at least one memory including computer program code;

the at least one memory and the computer program code configured to, with the at least one processor, cause the apparatus at least to:

send via a sidelink one or more messages from a first user equipment to one or more second user equipment indicating the first user equipment is changing to a different network access node and therefore might be changing a synchronization source, which the one or more second user equipment use to maintain a sidelink communication between the first and second user equipment;

perform by the first user equipment a handover process from a first network access node in a first wireless network to the different network access node in a second wireless network, the second wireless network using the second synchronization source; and attempt by the first user equipment to synchronize the one or more second user equipment to the second synchronization source, wherein the at least one processor and the computer program code are further configured to:

receive by the first user equipment a message from at least one of the one or more second user equipment that there is a synchronization failure by the at least one second user equipment to the second synchronization source; and the handover process comprises a random access channel procedure performed between the first user equipment and the different network access node, wherein the first user equipment receives timing information for the second synchronization source during the random access channel procedure, wherein the at least one processor and the computer program code are further configured to:

perform, after the handover is complete, a synchronization process, using timing for the second synchronization source and over the sidelink, by the first user equipment with the one or more second user equipment using one or more resources indicated by the synchronization information for communication over the sidelink with corresponding ones of the one or more second user equipment;

receive by the first user equipment a message from at least one of the one or more second user equipment that synchronization to the second synchronization source is complete;

set a timer by the first user equipment and in response to the sending the message indicating at least synchronization information for the second synchronization source; and determine by the first user equipment that synchronization with the second synchronization source has failed for one of the one or more second user equipment in response to the timer having expired prior to synchronization completion for the one second user equipment.

* * * * *